(12) United States Patent
Case et al.

(10) Patent No.: US 8,215,449 B2
(45) Date of Patent: Jul. 10, 2012

(54) MUFFLER SYSTEM FOR NOISE ABATEMENT AND ICE CONTROL

(75) Inventors: Michael Lee Case, Mississauga (CA); Tolulope Kayode Ajibola, Etobicoke (CA); Shakeel Khalfan, Mississauga (CA)

(73) Assignee: Longyear TM, Inc., South Jordan, UT (US)

( * ) Notice: Subject to any disclaimer, the term of this patent is extended or adjusted under 35 U.S.C. 154(b) by 173 days.

(21) Appl. No.: 12/629,506

(22) Filed: Dec. 2, 2009

(65) Prior Publication Data

US 2011/0126541 A1   Jun. 2, 2011

(51) Int. Cl.
*F01N 1/08*   (2006.01)
(52) U.S. Cl. .................... 181/230; 181/212
(58) Field of Classification Search .......... 181/230
See application file for complete search history.

(56) References Cited

U.S. PATENT DOCUMENTS

| | | |
|---|---|---|
| 172,245 A | 1/1876 | Butler |
| 706,844 A | 8/1902 | Motsinger |
| 888,489 A | 5/1908 | Gustafson |
| 969,101 A | 8/1910 | Gibson |
| 1,338,520 A | 4/1920 | Moores |
| 1,373,221 A | 3/1921 | Blackburn |
| 1,468,398 A | 9/1923 | Reed |
| 1,644,794 A | 10/1927 | Saharoff |
| 1,760,682 A | 5/1930 | Boysen |
| 1,838,834 A | 12/1931 | Holzer |
| 2,037,102 A | 4/1936 | Vipond |
| 2,054,956 A | 9/1936 | St. Stephens |
| 2,057,304 A | 10/1936 | Saint-Jacques |
| 2,128,742 A | 8/1938 | Fuehrer |
| 2,139,736 A | 12/1938 | Durham |
| 2,170,704 A | 8/1939 | Bourne |
| 2,274,460 A | 2/1942 | Rauen |
| 2,512,823 A | 6/1950 | Blundell |
| 2,562,101 A | 7/1951 | Hoyle |
| 2,660,257 A | 11/1953 | Bourne et al. |
| 2,764,250 A | 9/1956 | Jeffords |
| 2,936,844 A | 5/1960 | Gill |
| 3,066,755 A | 12/1962 | Diehl |
| 3,166,152 A | 1/1965 | Conlin |
| 3,176,791 A | 4/1965 | Betts et al. |
| 3,243,011 A | 3/1966 | Hill |
| 3,255,844 A | 6/1966 | Wallace |
| 3,311,120 A | 3/1967 | Palmisano |

(Continued)

FOREIGN PATENT DOCUMENTS

DE       3125083 A1    1/1983

(Continued)

OTHER PUBLICATIONS

Office Action dated Jun. 24, 2009 from U.S. Appl. No. 12/128,166, filed May 28, 2008 (9 pages).

(Continued)

*Primary Examiner* — Forrest M Phillips
(74) *Attorney, Agent, or Firm* — Ballard Spahr LLP

(57) ABSTRACT

A method of controlling a discharge of an exhaust gas from a pneumatic device includes directing the exhaust gas from an exhaust port of the pneumatic device into proximity with a heated portion of the pneumatic device, expanding the exhaust gas in proximity with the heated portion of the pneumatic device to heat the exhaust gas, and discharging the exhaust gas to atmosphere.

21 Claims, 4 Drawing Sheets

U.S. PATENT DOCUMENTS

| | | | |
|---|---|---|---|
| 3,323,614 A | 6/1967 | Thrasher | |
| 3,340,958 A | 9/1967 | Conlin | |
| 3,365,022 A | 1/1968 | Barber et al. | |
| 3,530,953 A | 9/1970 | Conlin | |
| 3,554,316 A | 1/1971 | Judd | |
| 3,577,728 A | 5/1971 | Von Brimer et al. | |
| 3,599,756 A | 8/1971 | Pickle | |
| 3,635,299 A * | 1/1972 | Hayes | 181/230 |
| 3,688,868 A | 9/1972 | Gibel | |
| 3,750,841 A | 8/1973 | Brown | |
| 3,776,366 A | 12/1973 | Betts et al. | |
| 3,815,705 A * | 6/1974 | Bennett | 181/230 |
| 3,898,064 A | 8/1975 | Tao et al. | |
| 3,907,528 A | 9/1975 | Halter | |
| 3,927,525 A | 12/1975 | Jacobs | |
| 3,927,731 A | 12/1975 | Lancaster | |
| 3,941,206 A | 3/1976 | Halter | |
| 3,957,446 A | 5/1976 | Mayer et al. | |
| 3,981,378 A | 9/1976 | Potter | |
| 3,995,712 A | 12/1976 | Leistritz et al. | |
| 4,010,819 A | 3/1977 | Ekstrom et al. | |
| 4,027,740 A | 6/1977 | Martin | |
| 4,028,076 A | 6/1977 | Fields | |
| 4,079,809 A | 3/1978 | Visnapuu et al. | |
| 4,082,160 A | 4/1978 | Schilling et al. | |
| 4,109,749 A | 8/1978 | Sweet | |
| 4,113,052 A * | 9/1978 | McElroy, Jr. | 181/230 |
| 4,135,602 A | 1/1979 | Clark | |
| 4,243,110 A | 1/1981 | Clemenson et al. | |
| 4,244,442 A | 1/1981 | Scarton et al. | |
| 4,294,330 A | 10/1981 | Baldwin et al. | |
| 4,303,133 A | 12/1981 | Godolphin | |
| 4,327,817 A | 5/1982 | Scarton et al. | |
| 4,346,783 A | 8/1982 | Scarton et al. | |
| 4,402,383 A | 9/1983 | Bailey | |
| 4,424,882 A | 1/1984 | Moller | |
| 4,474,260 A | 10/1984 | Valentine | |
| 4,483,402 A | 11/1984 | Vonhoff, Jr. | |
| 4,496,023 A * | 1/1985 | Lindberg et al. | 181/230 |
| 4,558,763 A | 12/1985 | Montabert | |
| 4,565,259 A | 1/1986 | Stoll | |
| 4,624,339 A | 11/1986 | Marcel et al. | |
| 4,880,078 A | 11/1989 | Inoue et al. | |
| 5,152,366 A | 10/1992 | Reitz | |
| 5,189,267 A * | 2/1993 | Ligman | 181/230 |
| 5,214,253 A | 5/1993 | Houston, Jr. | |
| 5,214,254 A | 5/1993 | Sheehan | |
| 5,373,119 A | 12/1994 | Suzuki et al. | |
| 5,376,762 A * | 12/1994 | Kimberlin | 181/230 |
| 5,545,860 A | 8/1996 | Wilkes et al. | |
| 5,581,055 A | 12/1996 | Self et al. | |
| 5,729,973 A | 3/1998 | Zander et al. | |
| 5,731,556 A | 3/1998 | Gardner et al. | |
| 5,844,178 A | 12/1998 | Lothringen | |
| 5,952,623 A * | 9/1999 | Sterling | 181/230 |
| 6,199,656 B1 | 3/2001 | Vento et al. | |
| 6,382,348 B1 | 5/2002 | Chen | |
| 6,457,551 B1 | 10/2002 | Chang | |
| 6,576,028 B2 | 6/2003 | Santos | |
| 6,668,971 B2 * | 12/2003 | Sterling | 181/230 |
| 6,679,351 B2 | 1/2004 | Cummings et al. | |
| 6,782,780 B2 | 8/2004 | Dasso | |
| 6,892,853 B2 | 5/2005 | Cai et al. | |
| 6,959,782 B2 | 11/2005 | Brower et al. | |
| 7,040,451 B2 | 5/2006 | Schumacher et al. | |
| 7,052,247 B2 | 5/2006 | Lee | |
| 7,191,868 B2 | 3/2007 | Craig et al. | |
| 7,216,739 B2 | 5/2007 | Sterling | |
| 7,845,464 B2 * | 12/2010 | Roberts et al. | 181/230 |
| 2001/0013443 A1 * | 8/2001 | Sterling | 181/230 |
| 2003/0150669 A1 | 8/2003 | Craig et al. | |
| 2004/0055815 A1 * | 3/2004 | Sterling | 181/230 |
| 2005/0103566 A1 * | 5/2005 | Sterling | 181/230 |
| 2005/0269152 A1 * | 12/2005 | Sellers et al. | 181/230 |
| 2006/0037811 A1 | 2/2006 | Kensok et al. | |
| 2009/0090530 A1 | 4/2009 | Roberts et al. | |
| 2009/0294211 A1 | 12/2009 | Roberts | |
| 2010/0155174 A1 * | 6/2010 | Roberts et al. | 181/230 |
| 2011/0126541 A1 * | 6/2011 | Case et al. | 60/685 |

FOREIGN PATENT DOCUMENTS

| | | |
|---|---|---|
| FR | 2227808 A5 | 11/1974 |
| JP | S53-28503 | 3/1978 |
| JP | S57-148013 | 9/1982 |
| JP | 59-124504 | 7/1984 |
| JP | S59-126118 | 8/1984 |
| JP | S60-98711 | 7/1985 |
| JP | 07-248090 | 9/1995 |
| JP | 2006062067 A | 3/2006 |
| JP | 2006-194157 | 7/2006 |
| WO | 03/009974 A1 | 2/2003 |
| WO | 2009-012228 A2 | 1/2009 |

OTHER PUBLICATIONS

Notice of Allowance dated Jan. 11, 2010 from U.S. Appl. No. 12/128,166, filed May 28, 2008 (6 pages).

Notice of Allowance dated Mar. 24, 2010 from U.S. Appl. No. 12/128,166, filed May 28, 2008 (6 pages).

Notice of Allowance dated Apr. 20, 2010 from U.S. Appl. No. 12/128,166, filed May 28, 2008 (6 pages).

Issue Notification dated May 26, 2010 from U.S. Appl. No. 12/128,166, filed May 28, 2008 (1 page).

International Search Report dated Jun. 23, 2009 from International Patent Application No. PCT/US2008/087637 filed Dec. 19, 2008 (2 pages).

International Preliminary Report on Patentability dated Nov. 30, 2010 from International Patent Application No. PCT/US2008/087637 filed Dec. 19, 2008 (5 pages).

Office Action dated Sep. 25, 2009 from U.S. Appl. No. 12/169,514, filed Jul. 8, 2008 (10 pages).

Notice of Allowance dated Dec. 29, 2009 from U.S. Appl. No. 12/169,514, filed Jul. 8, 2008 (6 pages).

Issue Notification dated Mar. 3, 2010 from U.S. Appl. No. 12/169,514, filed Jul. 8, 2008 (1 page).

International Search Report dated Jan. 5, 2009 from International Patent Application No. PCT/US2008/069992 filed Jul. 14, 2008 (2 pages).

International Preliminary Report on Patentability dated Jan. 19, 2010 from International Patent Application No. PCT/US2008/069992 filed Jul. 14, 2008 (4 pages).

Office Action dated Jun. 4, 2010 from U.S. Appl. No. 12/721,427, filed Mar. 10, 2010 (7 pages).

Notice of Allowance dated Sep. 13, 2010 from U.S. Appl. No. 12/721,427, filed Mar. 10, 2010 (6 pages).

Issue Notification dated Nov. 17, 2010 from U.S. Appl. No. 12/721,427, filed Mar. 10, 2010 (1 page).

International Search Report dated Aug. 25, 2011 from International Patent Application No. PCT/US2010/058651 filed Dec. 2, 2010 (3 pages).

* cited by examiner

MUFFLER SYSTEM FOR NOISE ABATEMENT AND ICE CONTROL

BACKGROUND OF THE INVENTION

1. The Field of the Invention

This application relates generally to exhaust control devices for use with pneumatic device. In particular, this application discusses noise abatement and ice control devices for use with pneumatically operated tools, such as pneumatic percussive drills.

2. The Relevant Technology

The process of converting energy stored in compressed air into motion for powering a pneumatic tool generates a significant amount of noise as the spent air (exhaust) is exhausted. In particular, pneumatic tools are operated by compressed air that enters a sealed chamber, exerts pressure on an internal piston, and causes the piston to move forward and back repeatedly. As spent compressed air is exhausted from the sealed chamber, the compressed air expands rapidly causing a loud noise. Often, the operation of pneumatic tools requires a close proximity between the tool and an operator, and the noise generated by the tool can be loud enough to be potentially harmful to the operator.

There are many approaches to reduce the noise from these devices. A common approach is a muffler consisting of an expansion chamber into which the exhaust flows and expands before venting to the atmosphere. While such approaches offer some improvement in noise reduction, they may be very complex and include several intricate parts that must be manufactured and fitted together at a significant cost. Additional difficulties are often present when the noise muffling device is used in a freezing environment.

In particular, as the spent air is expanded and exhausted ice can accumulate within the muffling device and/or at the outlet. This accumulation of ice can restrict the flow of air through the muffling device, which in turn can reduce the flow of air through the pneumatic device to which it is attached. Reducing the flow of air through the pneumatic device reduces the performance of the pneumatic device as pressurized air can remain partially unexhausted, thereby opposing the expansion of the gas in the desired direction which can adversely affect the performance of the pneumatic device. To restore proper performance of the pneumatic device, the muffling device is then de-iced, resulting in expensive delays.

The subject matter claimed herein is not limited to embodiments that solve any disadvantages or that operate only in environments such as those described above. Rather, this background is only provided to illustrate one exemplary technology area where some examples described herein may be practiced

BRIEF SUMMARY OF THE INVENTION

A method of controlling a discharge of an exhaust gas from a pneumatic device can include directing the exhaust gas from an exhaust port of the pneumatic device into proximity with a heated portion of the pneumatic device, expanding the exhaust gas in proximity with the heated portion of the pneumatic device to heat the exhaust gas, and discharging the exhaust gas to atmosphere.

A muffler system for controlling expansion of exhaust gas from a pneumatic device can include a housing having a first housing portion including a first portion configured to receive an exhaust gas from a pneumatic device, and a second portion fluidly coupled to the first portion. The second portion can be configured to be placed in proximity to a heated portion of a pneumatic device. The second portion can also be shaped to allow exhaust gas to expand therein.

A pneumatic system can include a pneumatic device including an exhaust port and a heated portion, and a muffler system fluidly coupled to the exhaust port, the muffler system including a housing having a first housing portion including a first portion configured to receive exhaust gas from a pneumatic device. The muffler system can also include a second portion fluidly coupled to the first portion, the second portion being configured to be placed in proximity to the heated portion of a pneumatic device. The second portion can be shaped to allow exhaust gas to expand therein.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to examples which are illustrated in the appended drawings. It is appreciated that these drawings depict only examples and are therefore not to be considered limiting of its scope. The following description can be better understood in light of the Figures, in which.

Figure 1:
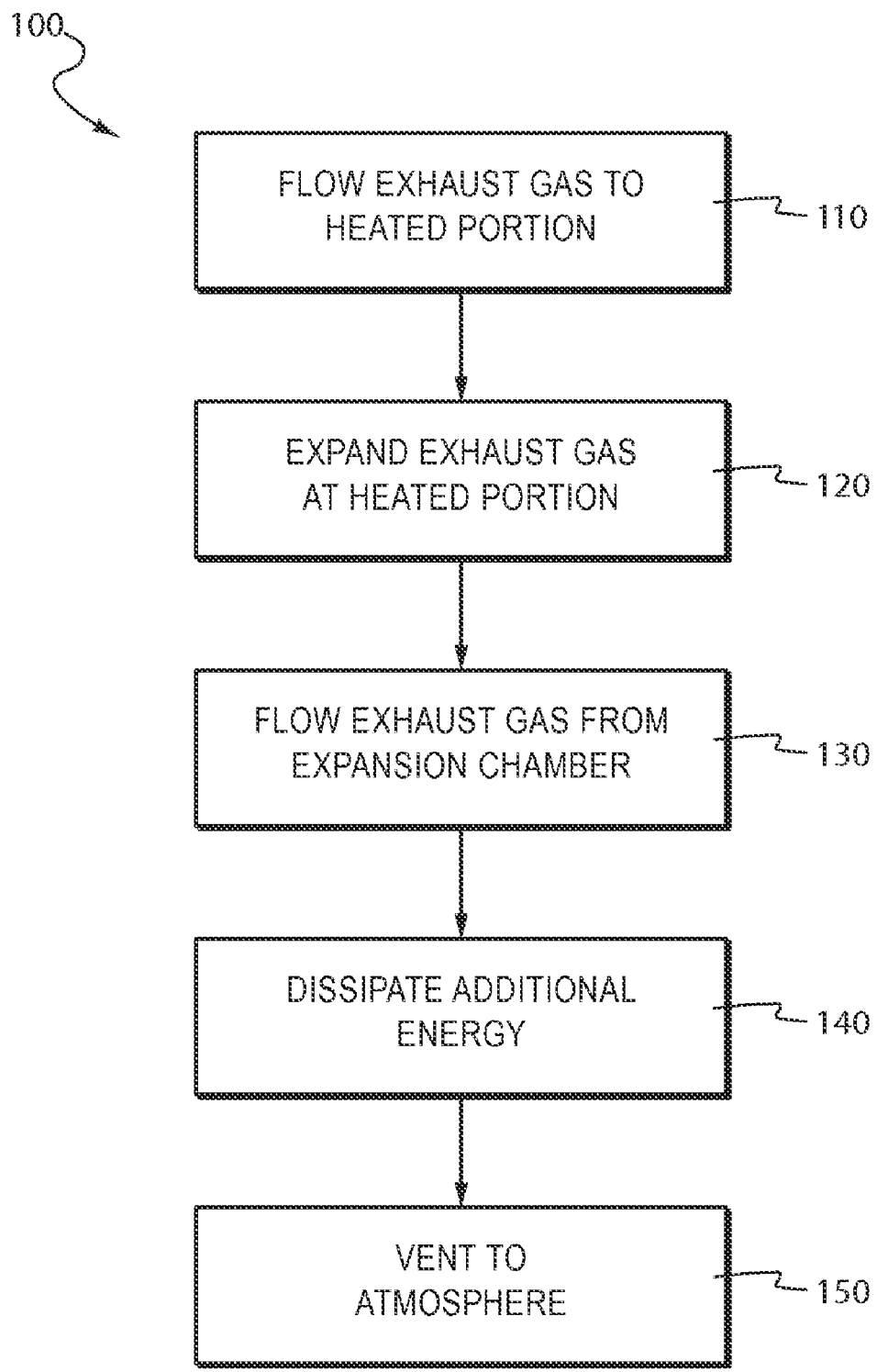
FIG. 1 is a flowchart introducing a method of providing noise abatement and ice control according to one example.

Together with the following description, the Figures demonstrate the features of the noise reducing devices and methods for making and using the noise reducing device. The thickness and configuration of components may be exaggerated in the Figures for clarity. The same reference numerals in different drawings represent the same element.

DETAILED DESCRIPTION OF THE PREFERRED EMBODIMENTS

A muffler system is provided herein that provides noise abatement as well as ice control. In at least one example, the muffler system directs the flow of exhausted air through a series of stages by which the exhaust is heated as it expands. For example, the exhaust air can be directed from the exhaust port at a relatively high pressure to a portion of the associated pneumatic device that operates at an elevated temperature and allowed to expand near that portion to heat the exhaust. Such a configuration can also act to simultaneously cool that portion of the pneumatic device. The exhaust can then be directed through additional stages to further dissipate the energy of the exhausted air to provide further noise abatement before the exhaust is discharged. In at least one example, the additional changes can include various changes in direction and/or expansion, which will be discussed in more detail below.

Accordingly, the muffler system is configured to provide a controlled and/or slowed dissipation of the energy in the exhaust while elevating the temperature of the flow during at least one intermediate stage. Elevating the temperature of the exhaust can reduce the likelihood that ice will accumulate within various parts of the muffler system and/or at the outlet (s) of the muffler system, thereby helping maintain proper airflow through a pneumatic device while providing both noise abatement and ice control.

In at least one example, the noise reducing device is part of a pneumatic drilling system. It will be appreciated that the noise reducing device and associated systems and methods can be implemented and used without employing these specific details. Indeed, the device and associated systems and methods can be placed into practice by modifying the device and associated systems and methods and can be used in conjunction with any existing apparatus, system, component, and/or technique. For example, while the description below focuses on a noise reducing device used with pneumatically operated percussive drills, the device may be modified for any pneumatically operated tools with a sudden exhaust, such as a blower, a breaker, an impact wrench, or any other type of device. The noise reducing device may also be used with any rapid gas exhaust device, including any suitable safety valve, compressor exhaust, or expanding gas vent. Further, the exhaust will be described below as being heated by a front head of a cylinder. It will be appreciated that other and/or additional forms of heat can be used to heat the exhaust as desired, including external sources of heat and/or different and/or additional parts of a pneumatic device.

FIG. 1 is a flowchart illustrating a method 100 of exhausting gas to provide noise abatement and ice control according to one example. As shown in FIG. 1, the method can include a first stage in which exhaust gas is flowed from an outlet port of the associated pneumatic device to another portion of the system that is in adjacent to a heated portion of the pneumatic device and/or a portion of the pneumatic device that operates at an elevated temperature as represented by step 110. For ease of reference, such a portion will be referred to as a heated portion, regardless of whether that portion of the device is heated by an external source or whether that portion(s) of the device operates at an elevated temperature. In at least one example, step 110 includes allowing the exhaust gas to flow along the cylinder while reducing energy drawn into the exhaust gas from the environment.

Once the exhaust gas is directed into proximity with the heated portion, the exhaust gas is allowed to at least partially expand in a second stage as represented by step 120. As the exhaust gas expands and circulates around the heated portion of the pneumatic device, the exhaust gas is heated. Heating the exhaust gas can cool the heated portion of the pneumatic device.

After the exhaust gas has been allowed to at least partially expand, the exhaust gas can then be flowed out of the expansion chamber in a third stage as represented schematically by step 130. Step 130 can include flowing the exhaust gas from the expansion chamber toward a silencer or other stage. Such a step can include allowing the exhaust gas flows to flow out of the expansion chamber with a flow volume that is approximately equal to the flow volume of the exhaust gas into the expansion chamber. In other examples, the flows in and out of the expansion chamber can be non-equal. Step 130 can also include providing a change in direction of the flow of the exhaust gas relative to one or more of the previous steps. In at least one example, flowing the exhaust gas from the expansion chamber can include flowing the exhaust gas toward another noise abatement portion of the system.

Accordingly, in a fourth stage the exhaust gas can enter into a silencer where the exhaust gas is allowed to further expand, change direction, and/or otherwise be subjected to energy and/or noise dissipation as represented by step 140. Thereafter, the exhaust gas can be vented to atmosphere, as represented by step 150. Accordingly, in at least one example the exhaust gas can be heated by a heated portion of an associated pneumatic device. Heating the exhaust gas can in turn reduce the accumulation of ice within the device and/or at the outlet of a muffler system. Such a process can be achieved in a number of ways. One example of controlling the exhaust of a pneumatic device will be described in more detail with reference to a rock drill.

Figure 2:
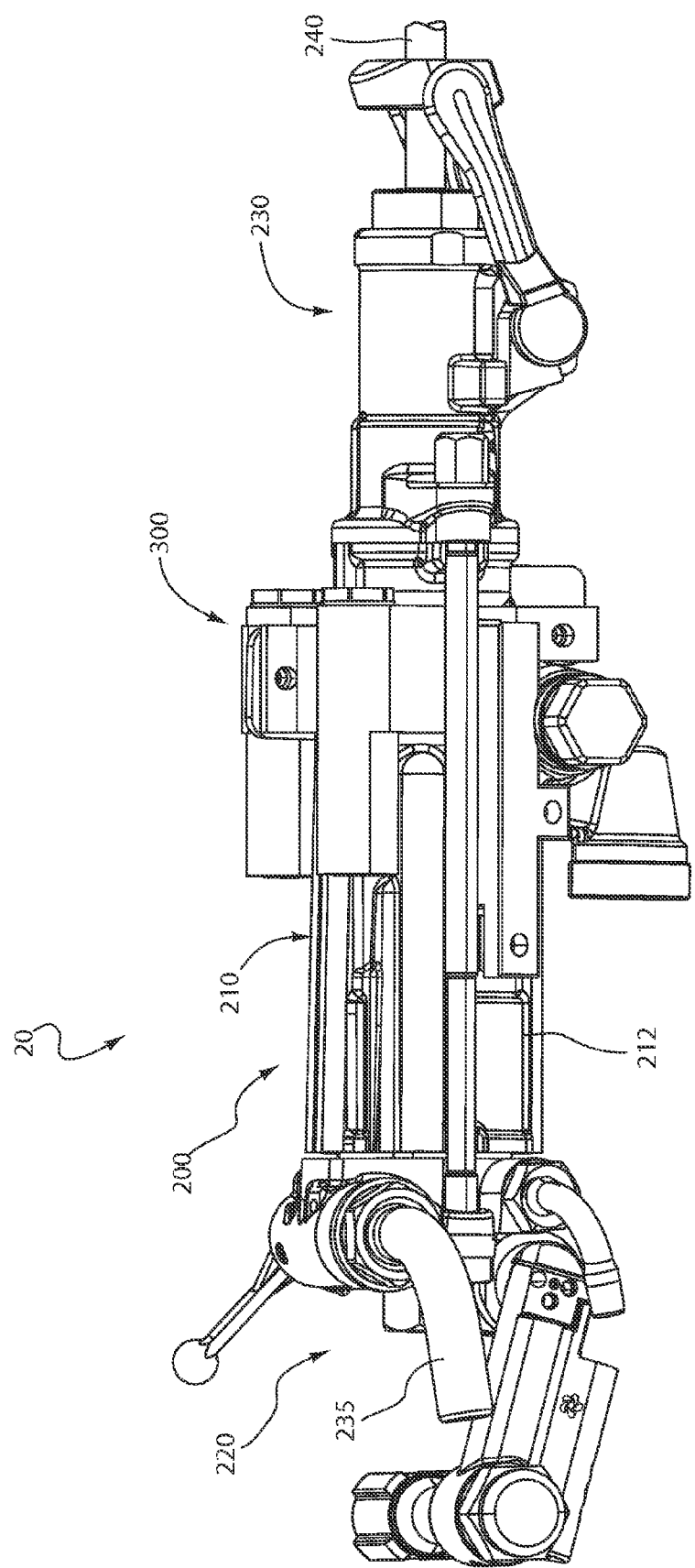
FIG. 2 illustrates one example of a system that includes a muffler system for noise abatement and ice control according to one example.

FIG. 2 illustrates a system 20 that includes a pneumatic device 200 and a muffler system 300. While a hand-held rock drill is shown, it will be appreciated that the muffler system 300 can be used with other types of pneumatic devices, including drifter rock drills. Although the muffler system 300 is shown as a separate component that is coupled to the pneumatic device 200, it will be appreciated that the muffler system 300 can be integrated into the pneumatic device 200 as desired.

In the example shown in FIG. 2, the pneumatic device 200 is a rock drill. In the illustrated example, the rock drill 200 includes a cylinder 210, a back head assembly 220 and a front head assembly 230. A pressurized gas, such as a compressed air, is direct to the rock drill 200 by way of air inlet 235. Inlet gas entering the chamber is directed by a valve assembly onto a piston in such a manner as to cause the piston to reciprocate within the cylinder 210. As the piston reciprocates, the piston is able to impact a drill steel 240, which is at least partially housed within the front head assembly 230. The impact of the piston on the drill steel 240 results in percussive forces that can be transmitted from the drill steel 240 to a drill bit and from the drill bit to a formation.

Reciprocation of the piston within the cylinder 210 can generate heat. In particular, in some examples the piston is in contact with a linear bearing, such as a bronze or other metallic liner within the cylinder 210 that guides the piston within the cylinder, particularly in a front portion of the cylinder 210. Although such a linear bearing can reduce friction due to other types of interfaces, such a configuration can still generate heat. Other factors can also act to heat the cylinder 210 and a front portion of the cylinder 210 in particular.

For example, the valve assembly housed within the pneumatic device can also be configured to direct air toward the front of the cylinder to establish an air cushion that can help prevent the piston from striking the cylinder 210, or bottoming out against the cylinder 210. The air cushion can be formed by compressing gasses, particular in a front portion of the cylinder. Compressing the gas can generate substantial heat within the cylinder, which in turn can be transmitted to the cylinder 210 and to the front portion of the cylinder in particular.

The muffler system 300 makes use of heated portions of the pneumatic device, such as a heated front portion of the cylinder 210, to help control and limit the accumulation of ice both within the muffler system 300 as well as at outlets of the muffler system 300. FIGS. 3A-3D illustrate the system 20 in which components other than the cylinder 210 and the muffler system 300 have been removed in order to facilitate discussion of the function of the muffler system.

Figure 3A:
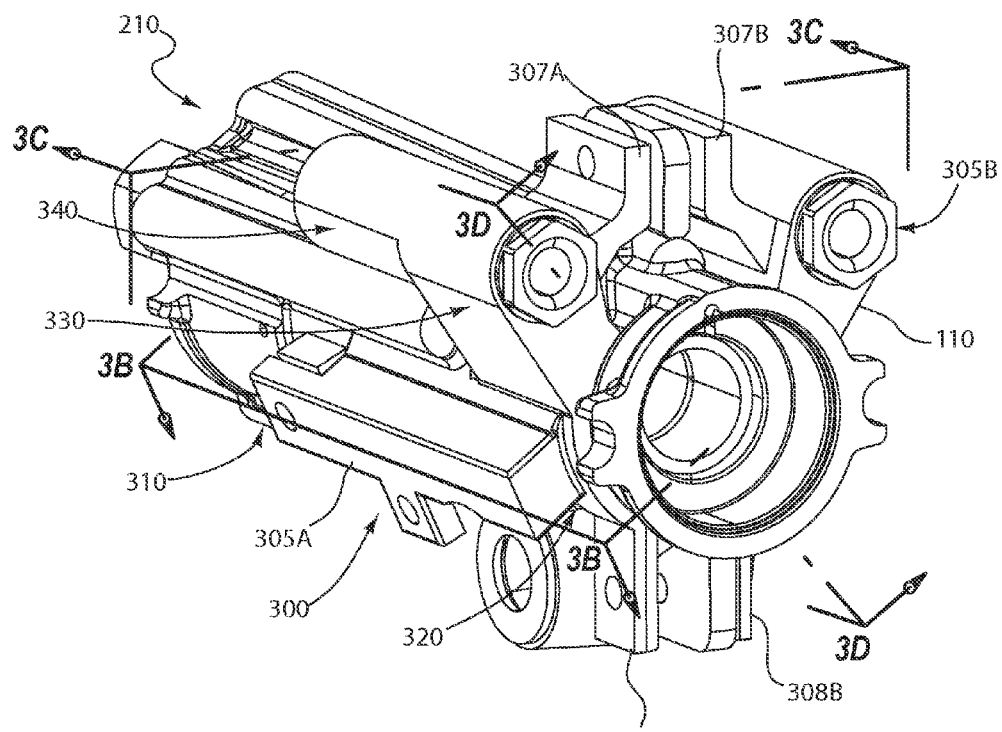
FIG. 3A illustrates a perspective view of a muffler system coupled to a cylinder of a pneumatic device according to one example.

Accordingly, FIG. 3A illustrates a perspective view of the cylinder 210 with the muffler system 300 attached thereto.

The muffler system 300 includes a first housing portion 305A and a second housing portion 305B that are configured to be secured to the cylinder 210. In the illustrated example, the first housing portion 305A includes opposing flanges 307A, 308A while the second housing portion 305B includes opposing flanges 307B, 308B. The opposing flanges 307A, 308A can be fastened to the opposing flanges 307B, 308B to thereby secure the pneumatic device 200. Any number of gaskets, seals, spacers, and/or other components can be used as desired, such as to provide or enhance sealing contact between the first and second housing portions 305A, 305B and the cylinder 210. Further, the opposing flanges can be fastened together and/or to the cylinder 210. For example, the first and second housing portion 305A, 305B can be bolted together and to the cylinder 210. Such a configuration can allow the muffler system 300 to be readily attached to a pneumatic device. In other examples, the first and second housing portion 305A, 305B can be integrally formed with the pneumatic device 200.

The first housing portion 305A and the second housing portion 305B can be mirror images of each other and each may receive exhaust gas from a corresponding outlet port defined in the cylinder 210. For ease of reference, the first housing portion 305A will be discussed. It will be appreciated that the discussion of the first housing portion 305A is equally applicable to the second housing portion 305B.

Figure 3B:
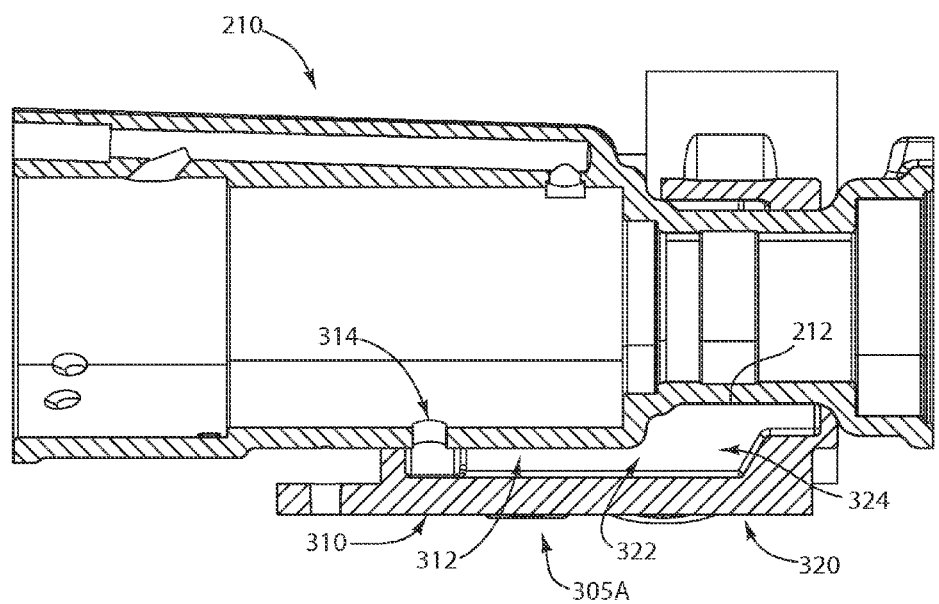
FIG. 3B illustrates a cross-sectional view of the muffler system coupled to the cylinder of the pneumatic device taken along section 3B-3B of FIG. 3A.

In the illustrated example, the first housing portion 305A includes recesses and/or channels defined therein and/or cooperates with an outer wall 212 of the cylinder to form a first portion 310, a second portion 320, a third portion 330, and a fourth portion 340. One such example is illustrated in FIG. 3B, which is a partial cross sectional view of the first housing portion 305A in engagement with the cylinder 210 as taken along section 3B-3B of FIG. 3A. As shown in FIG. 3B, the first portion 310 is in communication with a port 314 defined in the cylinder 210.

Exhaust gas directed from the cylinder 210 enters the first portion 310. The first portion 310 can include a channel 312 defined therein that extends between the port 314 to the second portion 320. In at least one example, the first portion 310 can be configured to allow the exhaust gas to flow from the port 314 and along the cylinder 210 with minimal expansion or pressure drop relative to the pressure of the exhaust gas as it initially enters the first portion 310. Further, as shown in FIG. 3B in at least one example the exhaust gas can flow along the outer wall 212 of the cylinder 210.

The first portion 310 is in fluid communication with the second portion 320 such that the exhaust gas flowing through the first portion 310 is directed to the second portion 320. As shown in FIG. 3B, a port 322 provides fluid communication between the first portion 310 the second portion 320, which forms an expansion chamber 324. In the illustrated example, an inner wall of the expansion chamber 324 is formed by the outer wall 212 of the cylinder 210. Such a configuration allows for heat exchange between the exhaust gas and the outer wall 212 of the cylinder 210 as the exhaust gas expands into the expansion chamber 324. The heat exchange between the exhaust gas and the cylinder 210 can heat the exhaust gas as well as cool the cylinder 210.

Figure 3C:
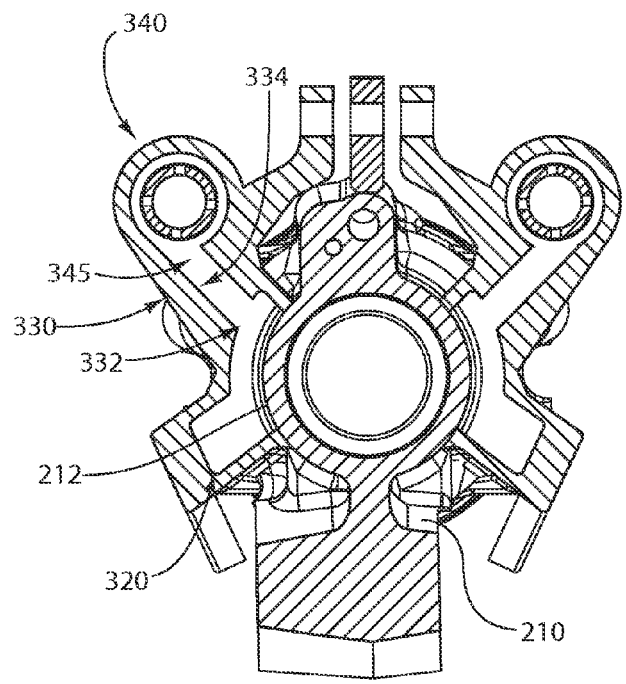
FIG. 3C illustrates a cross-sectional view of the muffler system coupled to the cylinder of the pneumatic device taken along section 3C-3C of FIG. 3A.

FIG. 3C illustrates a cross-sectional view of the cylinder 210 and the muffler system 300 taken along section 3C-3C of FIG. 3A. As shown in FIG. 3C, the second portion 320 is in fluid communication with the third portion 330 by way of port 332. The third portion 330 includes a channel 334 defined therein that is in fluid communication with the fourth portion 340. The flow rate of exhaust gas through the third portion 330 can be approximately equal to the flow rate of exhaust gas into and through the third portion 330 or can be different. In at least one example, the port 332 and/or the channel 334 can have a larger diameter than port 322 leading into the expansion chamber 324. Such a configuration can allow the flow rate in and out of the expansion chamber 324 to be the same while reducing any pressure increases of the exhaust gas after it is expanded in the expansion chamber 324 and travels through the third portion 330.

The third portion 330 is in fluid communication with the fourth portion 340 by way of port 345. In at least one example, the fourth portion 340 can be configured to generate an at least partial vortex as the exhaust gas travels through the fourth portion 340. One example will now be discussed in more detail with reference to FIG. 3D.

Figure 3D:
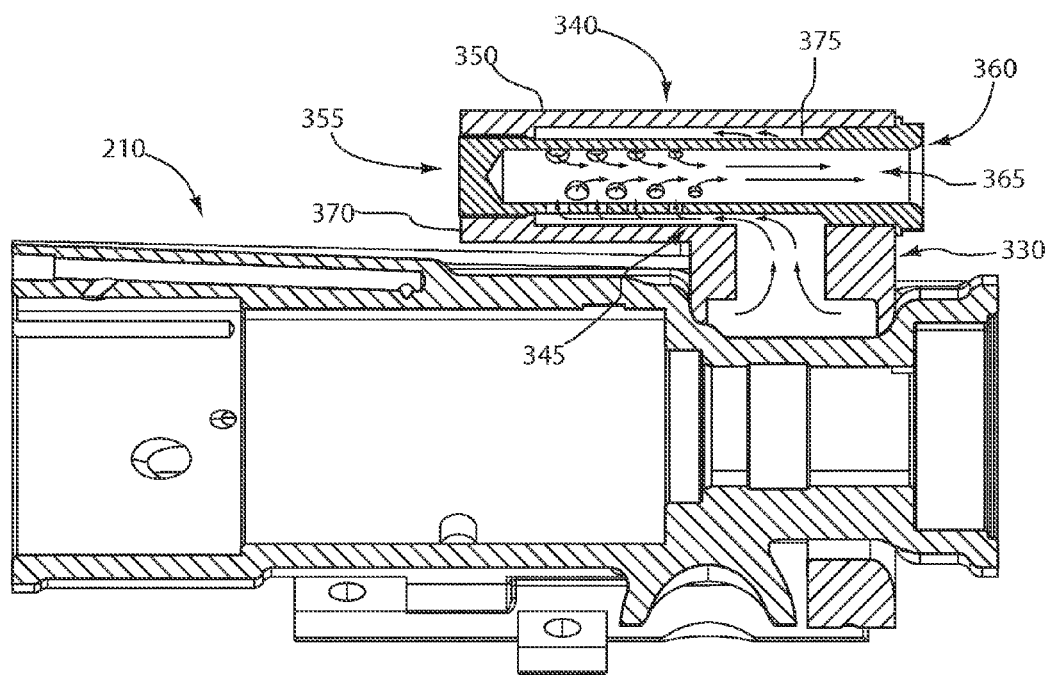
FIG. 3D illustrates a cross-sectional view of the muffler system coupled to the cylinder of the pneumatic device taken along section 3C-3C of FIG. 3A.

FIG. 3D illustrates a fourth portion 340 of the muffler system 20 according to one example. As shown in FIG. 3D, the fourth portion 340 may include a housing 350 in communication with the third portion 330. The housing 350 in turn may include a first end 355 and a second end 360. An outlet 365 is in fluid communication with the second end 360 of the housing 350. At least a portion of the outlet 365 is located proximate to a longitudinal axis. In the illustrated example, the outlet 365 includes one or more openings defined in the second end 360.

It will be appreciated that the outlet 365 may include openings that are distributed about some portion of the length of the housing 350 or other configurations that allow the fourth portion 340 to exhaust air introduced into the housing 350 from the third portion 330. Further, the outlet 365 may be any shape, including circular, ellipsoidal, square, rectangular, polygonal, and combinations of these shapes. Indeed, FIG. 3D shows that the outlet 365 may be substantially circular in some examples. The third portion 330 is located transverse to a longitudinal axis in such a manner as to cause exhaust directed from the third portion 330 to the housing 350 to whirl about an expansion chamber formed by the housing 350 as the exhaust is introduced.

As further illustrated in FIG. 3D, the housing 350 may define an open-space therein to thereby form an expansion chamber. In particular, the housing 350 forms a main body at least partially between the first end 355 and the second end 360 that defines a perimeter of an expansion chamber. Further, the first end 355 in the illustrated example terminates in a first end wall 370 while the second end 360 may be configured to receive a port 345 is formed in the housing 350 to provide fluid communication between the third portion 330 and the fourth portion 340.

The first end wall 370 may have any characteristic that helps the noise reducing device to reduce noise from a pneumatic tool. The first end wall 370 may have any shape, including, but not limited to, a substantially planar shape, a convex shape, a concave shape, a conical, other shapes, or any combination of shapes. For example, FIG. 3D shows the fourth portion 340 may include first end wall 370 that is substantially planar. Further in the illustrated example, the outlet 365 includes a single opening defined in the second end 360.

One or more perforated tube 375 can be positioned within the housing 350. In the illustrated example the perforated tube 375 extends from near the first end wall 370 toward the second end 360. In particular, the perforated tube 375 can be in communication with the opening defined in the second end 360 such that the perforated tube exhausts air from the second end 360 of the fourth portion. As a result, cylindrically annular expansion cylinder is formed between the perforated tube 375 and the housing 350 with an additional generally cylindrical expansion chamber formed within the perforated tube 375. It will be appreciated that either expansion chamber may have any shape that may help exhaust introduced from the third portion 330 to whirl within the fourth portion 340 and create an at least partial vortex. Such shapes may include, without limitation, kidney-shaped, rectangular, square, round, conical, ellipsoidal, tubular, conical, polygonal, other shapes or any combination of shapes.

As a result, the fourth portion 340 is configured to provide multiple changes in the direction of the flow of an exhaust gas that is passed therethrough. Further, the fourth portion 350 can include dissipative and reactive elements that effectively reduce the noise while remaining compact in size. The sudden exhaust of air at a pressure above atmospheric pressure results in an incoherent set of sound waves with various amplitudes and frequencies.

On exiting the third portion 330, the exhaust expands and impinges on the inner surfaces of the fourth portion 340, where it is reflected and deflected. This action may result in a pressure and noise reduction. The path for the exhaust is along the length of the noise reducing device in the general direction of the outlet 365. The exhaust spins and creates a vortex through the length of the chamber and expands into the available volume. The exhaust may circulate, mix, and change the direction of the circulating flow, which may result in pressure and/or noise reduction, which may result in noise dissipation and thus overall noise reduction. The outlet 365 is positioned such that when the exhaust contacts the ends it may be reflected, which may also reduce the noise (reactive noise reducing). The exhaust finally vents through the outlet port to atmosphere. The spinning and mixing motion of the exhaust may reduce the directionality of the remaining noise and cause the noise to be effectively dispersed to atmosphere. Further, as previously introduced, the exhaust gas directed to the fourth portion 340 can be heated by a heated portion of a pneumatic device. Heating the exhaust gas during an intermediate expansion stage can help ensure the exhaust gas has sufficient thermal energy to resist the formation of ice as the exhaust gas is vented in cold environmental conditions. Further, the exhaust gas can be heated sufficiently to counter act the accumulation of ice that may have already accumulated at the outlet 365 or elsewhere in the pneumatic device.

Referring again to FIG. 2, some pneumatic rock drills 200 can be configured to provide generated air cushion of pressurized air to reduce the possibility that a piston within the rock drill 200 will bottom out on the cylinder 210. In some examples, the energy associated with the air cushion can generate significantly more heat if the drill steel 240 is removed. Accordingly, in some examples it may be possible for an operator to generate additional heat in the cylinder 210 by removing the drill steel and allowing the pneumatic rock drill 200 to run. The additional heat further heats the exhaust gas and can sufficiently heat the exhaust gas to melt ice that has already accumulated. Thereafter, the operator can replace the drill steel 240 and resume drilling operations as normal. The ability to use the thermal energy created by a pneumatic device can thus allow an operator to run for a relatively long period while controlling accumulation of ice. Such a configuration can also allow an operator to de-ice a pneumatic device that in which ice has already accumulated by using the thermal energy generated by the pneumatic device to heat the exhaust air.

Accordingly, the noise reducing device may reduce noise better than some conventional noise reducing devices while also providing ice control in an integrated fashion. The noise reducing device may also be simpler in construction and compact in size. Additionally, as described above, the spinning motion may also reduce the directionality of noise that exits in the outlet port, and thereby, cause the noise to disperse more effectively. Similarly, because the outlet port may be relatively large, the noise reducing device may not impede the flow of exhaust so as to noticeably reduce the performance of the pneumatic tool. The noise reducing device may be embodied in other specific forms without departing from the spirit or essential characteristics of this application. The described embodiments are to be considered in all respects only as illustrative and not restrictive. The scope of the application is, therefore, indicated by the appended claims rather than by the foregoing description. All changes that come within the meaning and range of equivalency of the claims are to be embraced within their scope.

What is claimed is:

1. A method of controlling a discharge of an exhaust gas from a pneumatic device, comprising:
    directing the exhaust gas from an exhaust port of the pneumatic device into proximity with a heated portion of the pneumatic device;
    expanding in an expansion chamber the exhaust gas in proximity with the heated portion of the pneumatic device to heat the exhaust gas; and
    discharging the exhaust gas to atmosphere.

2. The method of claim 1, wherein directing the exhaust gas from the exhaust port of the pneumatic device into proximity with the heated portion of the pneumatic device includes maintaining the exhaust gas at substantially the same pressure as when the exhaust gas is vented from the exhaust port.

3. The method of claim 1, wherein expanding the exhaust gas in proximity with the heated portion of the pneumatic device includes expanding the exhaust gas in a front portion of a cylinder of the pneumatic device.

4. The method of claim 1, further comprising a passing of the exhaust gas through a silencer device after expanding the exhaust gas in proximity with the heated portion of the pneumatic device and before discharging the exhaust gas to atmosphere.

5. A muffler system for controlling expansion of exhaust gas from a pneumatic device, comprising:
    a housing having a first housing portion including:
        a first portion configured to receive an exhaust gas from a pneumatic device; and
        a second portion comprising an expansion chamber, the expansion chamber being fluidly coupled to the first portion, the second portion being configured to be placed in proximity to a heated portion of a pneumatic device.

6. The device of claim 5, further comprising a third portion fluidly coupled to the second portion and configured to change a direction of a flow of an exhaust gas the third portion receives from the second portion.

7. The device of claim 6, further comprising a silencer device fluidly coupled to the third portion.

8. The device of claim 7, wherein the third portion extends radially away from the second portion.

9. The device of claim 5, wherein the first portion is configured to direct exhaust gas from the pneumatic device to the second portion while maintaining a pressure of an exhaust gas.

10. The device of claim 5, wherein the first portion is configured to sealingly engage a cylinder of a rock drill and wherein the first portion is configured to extend toward a front portion of a cylinder of a rock drill.

11. The device of claim 5, wherein the second portion is configured to sealingly engage a front portion of a cylinder of a rock drill.

12. The device of claim 5, further comprising a second housing portion including a first portion configured to receive exhaust gas from a pneumatic device; and a second portion fluidly coupled to the first portion, the second portion being configured to be placed in proximity to the heated portion of a pneumatic device, the second portion being shaped to allow exhaust gas to expand therein.

13. The device of claim 12, wherein the first housing portion and the second housing portion are configured to be fastened to a pneumatic device.

14. A pneumatic system, comprising:
- a pneumatic device including an exhaust port and a heated portion; and
- a muffler system fluidly coupled to the exhaust port, the muffler system including a housing having a first housing portion including a first portion configured to receive exhaust gas from a pneumatic device, and a second portion comprising an expansion chamber, the expansion chamber being fluidly coupled to the first portion, the second portion being configured to be placed in proximity to the heated portion of a pneumatic device.

15. The system of claim 14, wherein the pneumatic device includes a cylinder having a outer wall, a rear portion, and a front portion.

16. The system of claim 15, wherein the front portion of the cylinder is the heated portion of the pneumatic device.

17. The system of claim 16, wherein the front portion of the cylinder is heated by at least one of reciprocation of a piston within the cylinder or compression of a gas within the cylinder.

18. The system of claim 17, wherein the pneumatic device is a rock drill.

19. The system of claim 15, wherein the first portion is sealingly coupled to the outer wall.

20. The system of claim 15, wherein the second portion is sealingly coupled to the outer wall near a front portion of the cylinder.

21. The system of claim 15, further comprising a second housing portion, wherein the first housing portion includes first flanges and the second housing portion includes second flanges, wherein the first flanges are configured to be fastened to the second flanges to secure the muffler system to the pneumatic device.

* * * * *